(12) United States Patent
Kurtz

(10) Patent No.: US 6,226,848 B1
(45) Date of Patent: May 8, 2001

(54) VEHICLE ASSEMBLY METHOD

(76) Inventor: Gunter Kurtz, Handwerkstrasse 16, 66663 Merzig (DE)

( * ) Notice: Subject to any disclaimer, the term of this patent is extended or adjusted under 35 U.S.C. 154(b) by 0 days.

(21) Appl. No.: 09/094,195

(22) Filed: Jun. 9, 1998

(51) Int. Cl.⁷ .................... B23Q 17/00; G01M 19/00
(52) U.S. Cl. .................... 29/407.01; 29/430; 29/464; 29/784; 29/787; 29/795
(58) Field of Search ................. 29/783, 784, 786, 29/787, 791, 793, 795, 799, 822, 824, 407.01, 430, 464

(56) References Cited

U.S. PATENT DOCUMENTS

| | | | |
|---|---|---|---|
| 4,893,402 | * | 1/1990 | Hiraska et al. .................. 29/822 |
| 4,937,929 | * | 7/1990 | Nokajima et al. ................ 29/430 |
| 5,088,176 | * | 2/1992 | Koga ........................... 29/430 |
| 5,167,065 | * | 12/1992 | Koga ........................... 29/824 |
| 5,319,840 | * | 6/1994 | Yamamoto et al. ............... 29/430 |
| 5,513,428 | * | 5/1996 | Shiramizu et al. ............... 29/786 |

FOREIGN PATENT DOCUMENTS

| | | | |
|---|---|---|---|
| 3729084 | * | 7/1994 | (DE) ........................... 29/791 |
| 406190662 | * | 7/1994 | (JP) ............................ 29/822 |

* cited by examiner

*Primary Examiner*—S. Thomas Hughes
*Assistant Examiner*—Jermie E. Cozart
(74) *Attorney, Agent, or Firm*—Rader, Fishman & Grauer PLLC

(57) ABSTRACT

A vehicle assembly line for automatically and continuously assembling vehicle components to a vehicle assembly. The vehicle assembly line can include multiple stations such as a component assembly station, module assembly station, fluid filling station, door assembly station, wheel alignment station, and brake test station.

41 Claims, 15 Drawing Sheets

VEHICLE ASSEMBLY METHOD

BACKGROUND OF THE INVENTION

1. Field of the Invention

The invention relates to an automatic assembly apparatus and method; and, more particularly, to an apparatus and method for automatically assembling a vehicle by installing various parts to a vehicle assembly along a line having multiple part installation stations.

2. Description of the Related Art

In contemporary vehicle assembly operations (assembly lines), a vehicle conveyor carries a vehicle assembly through multiple part assembly stations where various parts are fitted to the vehicle assembly to ultimately produce a completed a vehicle. The vehicle assembly usually begins as a vehicle body to which the various parts are assembled to build the vehicle. The parts are brought to the various assembly areas by part conveyors, which can include trucks carrying the part to be mounted to the vehicle body. In prior assembly lines, the parts conveyors do not run continuously and synchronously with the vehicle conveyor and the parts conveyor has more trucks than can be received by the vehicle conveyor, resulting in the need to have a back-up area to store the trucks carrying the parts to be assembled to the vehicle conveyor. Other assembly lines require that the vehicle conveyor and the parts conveyor be stopped while the vehicle body is aligned with the part prior to assembly of the part to the vehicle body. Yet, other assembly lines require that the truck be stopped momentarily until it is synchronized with the vehicle, and the vehicle conveyor then pulls the truck. These features are all known disadvantages of the prior assembly lines because the stopping of the vehicle conveyors for any amount of time results in a loss of vehicle production and naturally builds inefficiencies into the assembly process.

SUMMARY OF THE INVENTION

The invention addresses the disadvantages of the prior art vehicle assembly line and methods with an automatic vehicle assembly line that automatically and continuously mounts a vehicle component to a vehicle body. The vehicle assembly line comprises a vehicle body conveyor, which defines an assembly path. The assembly conveyor has multiple vehicle body holders, each of which is adapted to carry a vehicle body. The vehicle body conveyor continuously moves the body holders along the assembly path. The vehicle assembly line further comprises a component conveyor that defines a component path and has multiple component holders, which are adapted to hold a component to be assembled to the vehicle body. The component conveyor continuously moves the component holders along the component path. A portion of the component path coincides with the vehicle body path to define an assembly area in which the component is mounted to the vehicle body. The component conveyor and the vehicle body conveyor move in synchronous motion along the assembly area. A mating machine is disposed adjacent to and capable of moving along with the vehicle body conveyor and the component conveyor within the assembly area. The mating machine indexes the vehicle body holder and the component holder relative to the mating machine and couples the vehicle body holder and the component holder as they are moving.

The indexing of the vehicle body holder and the component includes indexing the vehicle body holder and the component holder to the mating machine while the vehicle body holder and the component holder are in continuous movement. Preferably, the vehicle body holder and the component holder are indexed to the mating machine by the alignment of guide slots and guide keys on the vehicle body holder and the component holder with corresponding guide slots or guide keys on the mating machine. The invention further includes a fixing mechanism to couple the indexed vehicle body holder and component holder in the indexed position. The fixing mechanism includes an alignment pin extending from the component holder into an opening in one of the vehicle body holder or vehicle body and a holding mechanism for fixing the vehicle body bolder to the component holder. The holding mechanism holds the vehicle body holder and component holder in the fixed index position, independent of the mating machine.

In another embodiment, the invention is an automatic vehicle assembly line comprising a vehicle assembly conveyor defining an assembly path and having multiple vehicle assembly holders, each of which carries a vehicle assembly. The vehicle assembly conveyor continuously moves the vehicle assembly holders along the assembly path. The automatic vehicle assembly line further includes a component assembly station in which a component is assembled to the vehicle assembly carried by the vehicle assembly conveyor. The component assembly station comprises a component conveyor having multiple conveyor holders and carrying them along a component path. The component holders are adapted to hold a component to be mounted to the vehicle assembly carried by the vehicle assembly conveyor. The component conveyor continuously moves the component holders along the component path and a portion of the component path coincides with a portion of the assembly path to define an assembly area. The component conveyor and the vehicle assembly conveyor move in synchronous motion along the assembly area. The component station further includes a mating machine disposed adjacent to and capable of moving substantially parallel with the vehicle assembly conveyor and the component conveyor in the assembly area. The mating machine indexes the vehicle assembly holder and the component holder relative to the mating machine and couples the vehicle assembly holder and the component holder together during the continuous movement of the vehicle assembly holder and the component holder.

The automatic assembly line can further comprise a fastening station where the component is fastened to the vehicle assembly. The automatic assembly line additionally can comprise further stations, such as a module assembly station, a fluid filling station, a door assembly station, a wheel alignment station, and a brake testing station.

In yet another embodiment, the invention comprises a method of automatically assembling a vehicle in an automated line comprising a vehicle assembly conveyor defining an assembly path and having multiple vehicle assembly holders, each of which are adapted to carry a vehicle assembly; and a component conveyor defining a component path and having multiple component holders, each of which are adapted to carry a component. The component conveyor continuously moves the component holder along the component path. A portion of the component path coincides with the assembly path to define an assembly area. The method includes continuously moving the vehicle assembly holders and the component holders in synchronous motion along the assembly area and coupling the vehicle assembly holder to the component holder while the vehicle assembly holders and component holders are being continuously moved in synchronous motion.

BRIEF DESCRIPTION OF THE DRAWINGS

In the drawings:

FIG. 2 is a perspective view of a mating machine used in the component assembly station of FIG. 1a;

FIG. 3 is a perspective view of a fastening machine used in the component assembly station of FIG. 1a;

FIG. 4 is a perspective view of a carriage for carrying the vehicle component in the component assembly station of FIG. 1a;

DETAILED DESCRIPTION OF THE PREFERRED EMBODIMENTS

Figure 1A:
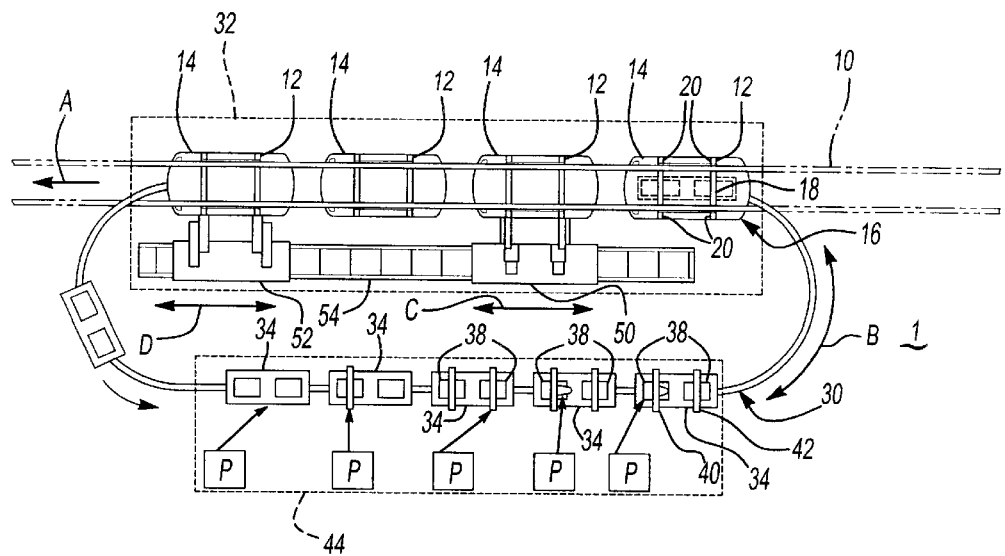
FIG. 1a is a schematic illustration of the component assembly station of an automatic vehicle assembly line for assembling a component carried by a component holder to a vehicle assembly carried by a vehicle assembly holder according to the invention.

FIGS. 1a though 1c schematically illustrate an automatic vehicle assembly line according to the invention. The automatic vehicle assembly line comprises various stations at which various vehicle parts are assembled to a vehicle assembly. The term vehicle assembly is used to describe a partially assembled vehicle to which parts are attached to complete the vehicle. Often, but not necessarily, the vehicle assembly begins with a vehicle body to which the other parts are assembled.

Figure 1B:
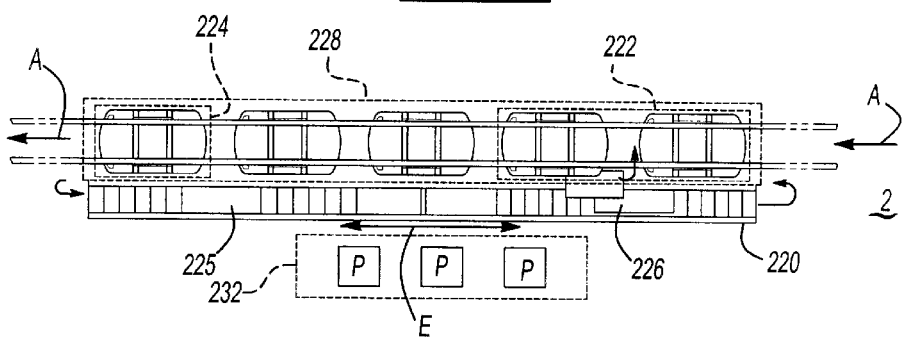
FIG. 1b is a schematic illustration of the module assembly station of the automatic vehicle assembly line.
Figure 1C:
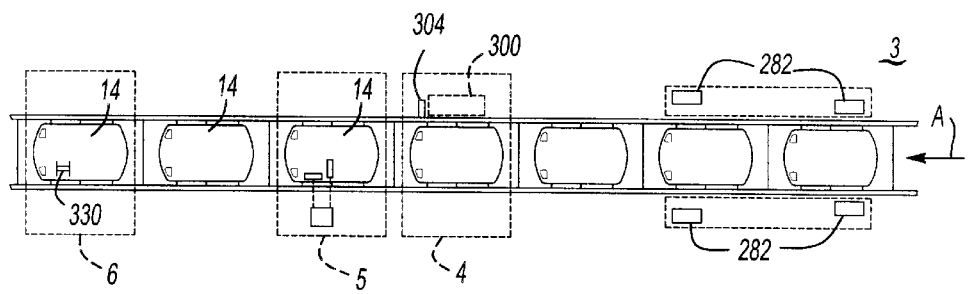
FIG. 1c is a schematic illustration of the fluid filling station, door assembly station, wheel alignment station, and brake test station of the automatic vehicle assembly line.

The automatic vehicle assembly line includes a component station 1, a module station 2, fluid filling station 3, door assembly station 4, wheel alignment station 5, and brake testing station 6, which are all connected by a vehicle conveyor 10. The stations illustrated in FIGS. 1a through 1c represent only some of the stations and not all the stations that might be found in such a vehicle assembly line. Other well known parts assembly stations are not included in this description, but could easily be included in the invention. The order of the stations can be changed depending on the assembly requirements for a particular vehicle.

The vehicle conveyor 10 has a plurality of vehicle assembly holders 12 on which are supported a vehicle assembly 14. The vehicle conveyor 10 defines an assembly path illustrated by direction arrow A. The vehicle conveyor 10 carries the vehicle assembly 14 along the assembly path A to the various parts assembly stations where the vehicle parts are assembled to the vehicle assembly. Initially, the vehicle assembly begins as a vehicle body and the various parts are assembled to the body to assemble or build the vehicle.

The vehicle assembly holder 12 suspended from the vehicle conveyor 10 is a hanger 16. The hanger 16 includes a lifting and lowering mechanism 18 from which extend multiple legs 20, each of which has a foot 22 (FIG. 2) that supports an edge of the vehicle assembly 14. Therefore, the vehicle assembly 14 is mounted on the opposing support feet 22 extending from the legs 20 of the hanger 16 and carried along the assembly path to the various assembly stations where the vehicle parts are assembled to the vehicle assembly 14.

Component Assembly Station

The component assembly station 1 comprises a component conveyor 30 that defines a component path illustrated by direction arrow B. A portion of the component path B coincides with a portion of the vehicle assembly path A to define an assembly area 32 wherein a vehicle component carried by the component conveyor 30 is assembled to the vehicle assembly 14. The term component is used in this description as a generic reference for any part assembled to the vehicle assembly. The term component includes single parts and multiple parts. The term sub-component refers to one or some of the parts of a component.

The component conveyor 30 comprises multiple carriages 34 that follow a guide rail 36, which follows the component path B. The carriages 34 have component holders 38 on which are provided components 40, 42 to be mounted to the vehicle assembly 14. A building area 44, disposed adjacent the component conveyor 30, provides an area where the components 40, 42 are placed on the component holders carried by the carriages.

The component assembly station 1 further comprises a mating machine 50 and a fastening machine 52 that are provided within or adjacent to the assembly area 32. The mating machine 50 and fastening machine 52 are mounted to a track 54, which is substantially parallel to the vehicle conveyor 10. The mating machine 50 and fastening machine 52 can both move along the conveyor path A in directions C, D, respectively.

In a short operational description, the carriages 34 pass through the building area 44 where various components 40, 42 are placed on the component holders 38. The carriages 34 then move along the component path B into the assembly area 32, where the mating machine 50 aligns the vehicle assembly 14 with the components 40, 42 and couples the components to the vehicle assembly in a position. The fastening machine 52 then fastens the component 40, 42 to the vehicle assembly 14 and the carriage 34 continues along the component path B to the building area 44, at which point the process is started over.

Figure 2:
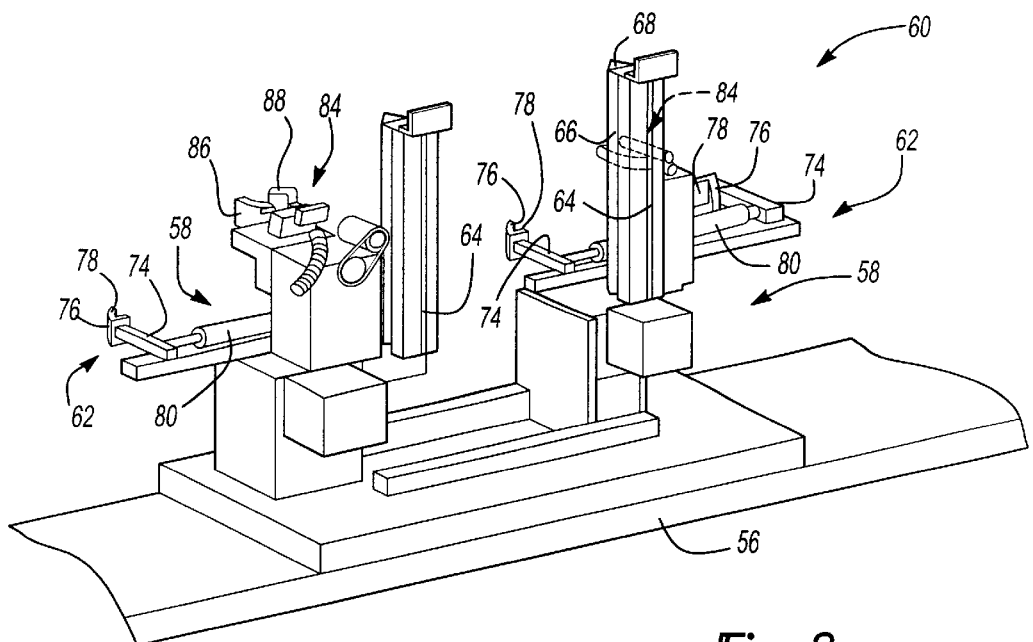

Looking at the various elements of the component assembly station 1 in greater detail, FIG. 2 illustrates the mating machine 50. The mating machine 50 comprises a base 56, which is movably mounted to the track 54 along path C. A pair of movable arm supports 58 are provided on the base 56. The arm supports 58 comprise vehicle assembly holder indexers 60 and component holder indexers 62. The vehicle assembly holder indexers 60 have vertical rails 64 to which is slidably mounted a guide keys 66 adapted to slide vertically with respect to the vertical rail 64. The guide key 66 has a wedge-shape cross section 68. The component holder indexers 62 comprise a pair of horizontally oriented arms 74 that terminate in hands 76, which define a wedge-shaped guide slot 78. The arms 74 are moveable horizontally with respect to the arm support 58 by an actuator 80, which can be of any suitable type. The arm supports 58 can be moved generally transversely with respect to the movement of the base 56. The transverse movement of the arm supports 58 move the vehicle assembly holder indexers 60, component holder indexers 62, and arms 74 into an operational position where they can perform the desired assembly operations to the vehicle assembly and the component.

The arm supports 58 further include a moveable hand 84 comprising opposing fingers 86, 88. The hands 84 can be extended and retracted to grasp a particular component or sub-component and move it to a predetermined position. The specific construction of the hand 84 and fingers 86, 88 can vary depending on the type of component being positioned.

Figure 3:
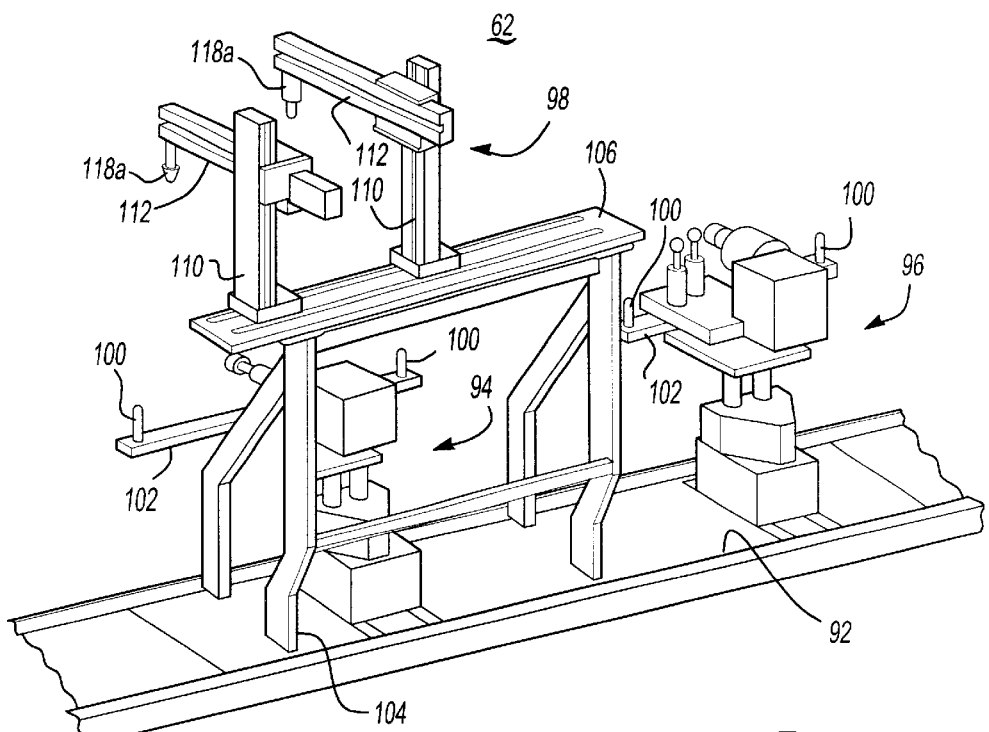

FIG. 3. illustrates the fastening machine 52 in greater detail. The fastening machine 52 comprises a base 92 on which are provided multiple tool support stations 94, 96, 98, which include one or more types of fastening tools, generically referenced as 108. The fastening tools 108 can be screwdrivers, nut drivers and other commonly used fastening tools. Tool support stations 94 and 96 can be moved transversely with respect to the direction D of the base 92 for the fastening machine 52 to position the fastening guns 108 in an operational position. The tool support stations 94 and 96 further include positioning pins 100, spaced on support arms 102, which couple the fastening station to the vehicle assembly.

The tool support station 98 comprises a skeletal frame 104 extending upwardly from the base 92 and having an upper platform 106 on which are moveably mounted fastening tools 108a. The tool support station 98 comprises a vertical support 110, which can move laterally with respect to the platform 106. The tool support station further comprise positioning arms 112, which can move vertically and horizontally with respect to the vertical support 110. The fastening tool 108a is provided at the end of the tool arms 112.

Figure 4:
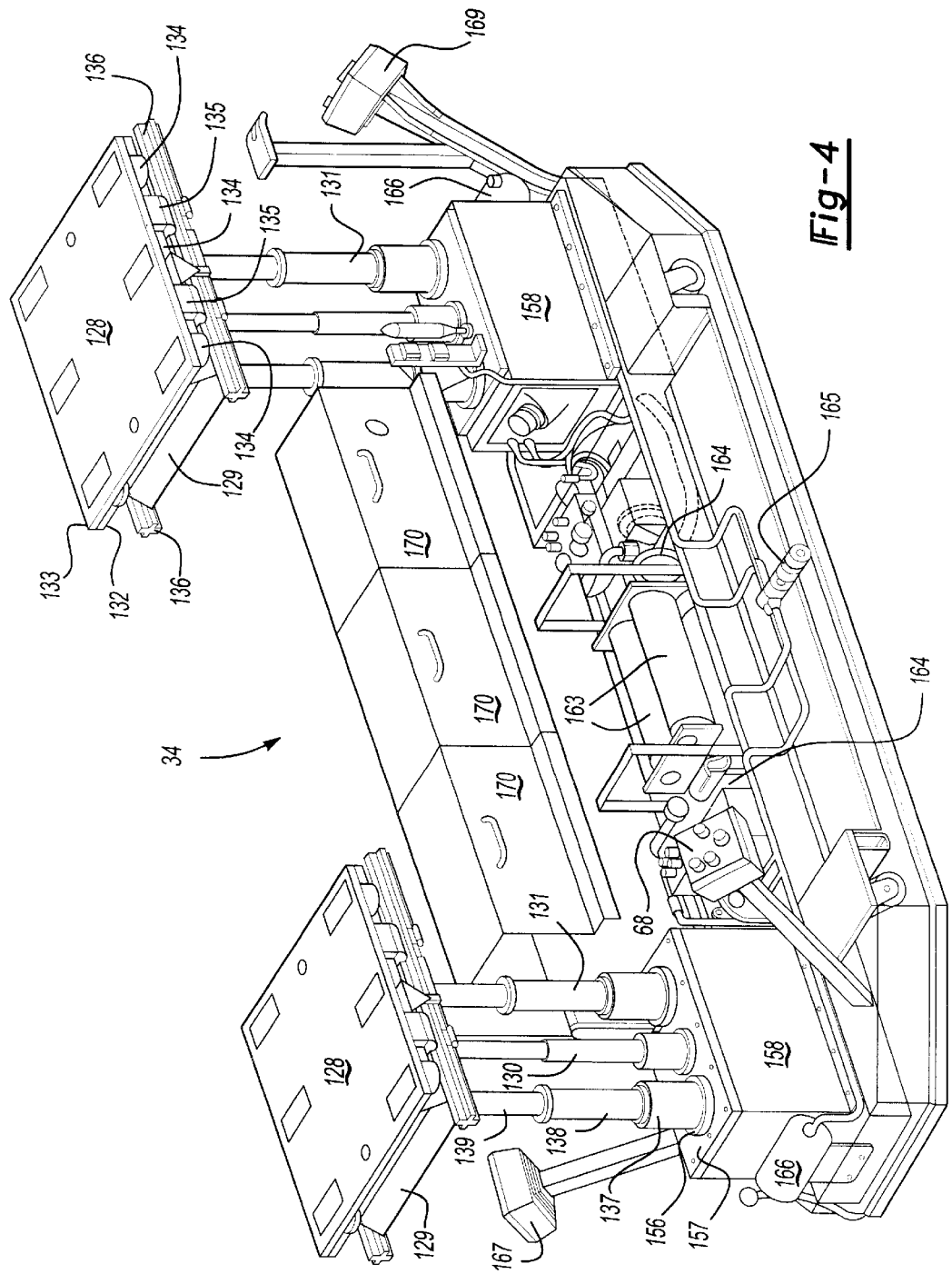
Figure 5:
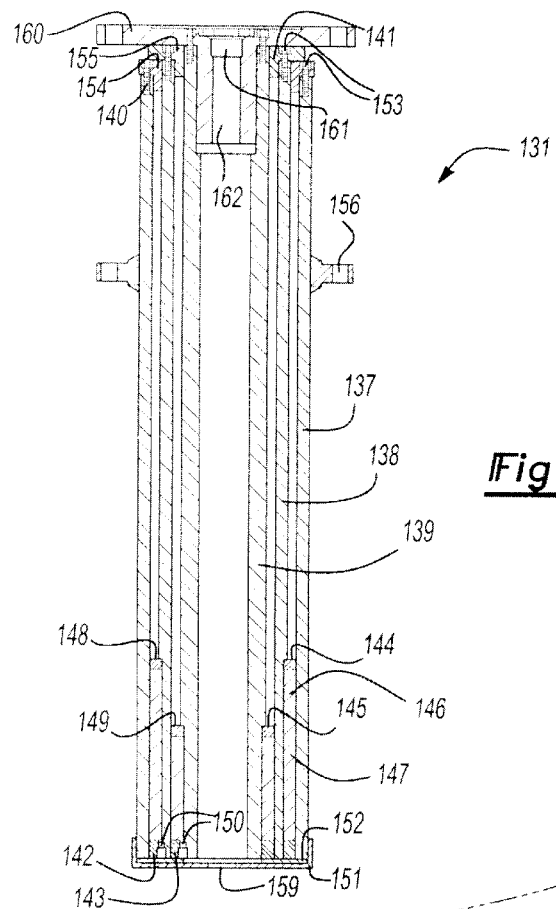
FIG. 5 is a sectional view of a lifting strut for the carriage of FIG. 4.

Referring to FIGS. 4 and 5, the carriages 34 will now be described in greater detail. The carriages 34 comprise a lifting platform 129 having a horizontal floating plate 128, which is guided so as to be displaceable both longitudinally and transversely to the longitudinal axis of the carriage. The lifting platform 129 is arranged on a hydraulic lifting cylinder 130 and a rod-type guide composed of two telescopic columns 131, which can be used to raise and lower the floating plate 128 on which the component holder 38 is mounted.

The floating plate 128 is composed of a lower plate 132 and an upper plate 133. In the lower plate 132, six cup-shape members 134 receive balls which, in turn, rest on smaller balls and which protrude out of the cup-shaped members 134 arranged at the bottom side of the lower plate and through recesses in the bottom plate 132, slightly above the upper surface of the lower plate 132 and support the upper plate 133. The upper plate 133 is supported and guided by bolts that engage oblong holes extending in the lower plate 132 in the transverse direction.

The lower plate 132 is moveable with two undercarriages 135 each on two rails 136 extending in the direction of the track on the lifting platform 129. The ability of the floating plate 128 to move relative to the lower plate 132 and upper plate 133 permits large horizontal displacements in the transverse and longitudinal directions, which aids in aligning the component holder 38 with the vehicle assembly holder 12.

The telescopic columns 131 comprise elements 137, 138, 139, which are guided by a ring 140 or 141, respectively, and arranged on an inner side of a tube at an upper end of the respectively wider element 137 or 138 in a ring 142 or 143, respectively, arranged at an outer side of the tube at a lower end of the respectively narrower element 138 or 139. In the extended position of the elements 137, 138, 139, the two rings 140, 142; 141, 143 are held apart at a distance from each other by a stop.

The stop is advantageously formed by a shoulder 144 or 145, provided on the respectively narrower element 138 or 139, respectively, and abutting the ring 140 or 141 of the wider element 137 or 138. This basically novel and also generally useable construction of a rod control system has significant advantages as compared to the known constructions in which the respectively narrower element is exclusively guided in a sleeve mounted at the upper end of the wider element at the inner side of the tube, wherein the sleeve has a greater axial extension than a ring. The advantage is that the elements slide uniformly and not suddenly when they are extended or retracted on the load. In addition, stability is gained in all not completely extended positions because of the increased distance between the statically determined supports at the two rings.

The shoulder 144 or 145 is produced by a turned portion extending from the lower end of the element 138 or 139 up to the shoulder 144 or 145 and a sleeve 146 or 147 slid onto the turned portion, wherein the wall thickness of the sleeve 146 or 147 is greater than the depth of the turned portion, and wherein the shoulder 144 or 145 is formed directly by a ring 148 or 149 of hard elastic plastic material, which is placed in front of an end face of the sleeve 146 or 147 and dampens the contact. The sleeve 146 or 147 is supported by the ring 142 or 143 arranged at the lower end of the respective element 138 or 139, wherein the ring 142 or 143 is fastened by means of headless screws 50 screwed in between the ring 142 or 143 an the wall of the element 138 or 139.

The telescopic column 131 is provided at the bottom with a floor 151 constructed as a screw cap, on which is placed a disk 152 of a hard-elastic plastic material in such a way that the extendible elements make contact at the end of the retracting process with the disk 152, which dampens the contact.

The rings 140 or 141 arranged at the upper ends of the elements 137 and 138 and fastened by means of screws 153 mounted at the end face are supported by a wiping ring 154 or 155, respectively, which is mounted in a groove and is effective in both directions.

The telescopic columns 131 are supported with a flange 156 on a container cover 157 and are immersed in an oil bath contained in the container 158. For this purpose, the floor 151 has an opening 159 for the oil. A support plate 160 arranged on the inner element 139 has an opening 162 for air, preferably provided with an air filter 161. The oil bath is the recirculating oil of the hydraulic lifting cylinder 130.

As a result of this configuration, the telescopic columns 131 are self-lubricating. The wiping rings 154 and 155 prevent oil from traveling along the elements to the outside and prevent dust from reaching the inside.

The hydraulic lifting cylinder 130 is in communication with a piston reservoir 163. The piston reservoirs 163 of the two lifting devices can be seen underneath the hoods 170, which are shown in the lifted-up position thereof. For filling and pressurizing the piston reservoirs 163, a pump each is provided driven by a compressed air motor 164. For this purpose, the carriage 134 has an intake pipe 165 for the compressed air supply common for both lifting devices, wherein the intake pipe 165 is preferably arranged on the side of the carriage 134 so as to be easily accessible. The compressed air supply takes place along a section of the track.

Through the intake pipe 165, simultaneously two compressed air tanks 166 can be filled for the pneumatic control of the carriage 134, wherein the control panels for the control are seen at 167, 168 and 169. This type of energy supply contributes to the fact that the carriages form self-contained units.

When a specific component reference is needed for clarity, the operation of the component assembly station 1 will be described in the context of mounting an engine, front suspension, and rear suspension to a vehicle body. The description is illustrative as many different kinds of components and sub-components can be assembled using the component assembly station.

To assemble a vehicle component 40, 42 to the vehicle assembly 14, the vehicle conveyor 10 carries the vehicle assembly 14 toward the component assembly station 1. The vehicle conveyor 10 and the component conveyor 30 move in a synchronous motion so that the vehicle assembly holders 12 generally correspond to a carriage 34. Since the vehicle assembly holders 12 and carriages 34 are substantially in sync because of the synchronous movement of their respective conveyors, the vehicle assembly holders 12 and carriages 34 are generally aligned upon entering the assembly area 32. As the generally aligned vehicle assembly holders 12 and component holders 38 enter the assembly area 32, the mating machine 50 moving along the track 54 in substantially synchronous movement with one of the paired vehicle assembly holders 12 and component holder 38. Preferably, the carriages 34 and the vehicle assembly conveyor 10 are independently powered or driven throughout their respective paths, negating the requirement that either stop or pause as the vehicle assembly conveyor 10 or carriages 34 are coupled together or where the conveyor 10 drives the carriage 34, unlike the prior art.

Figure 6:
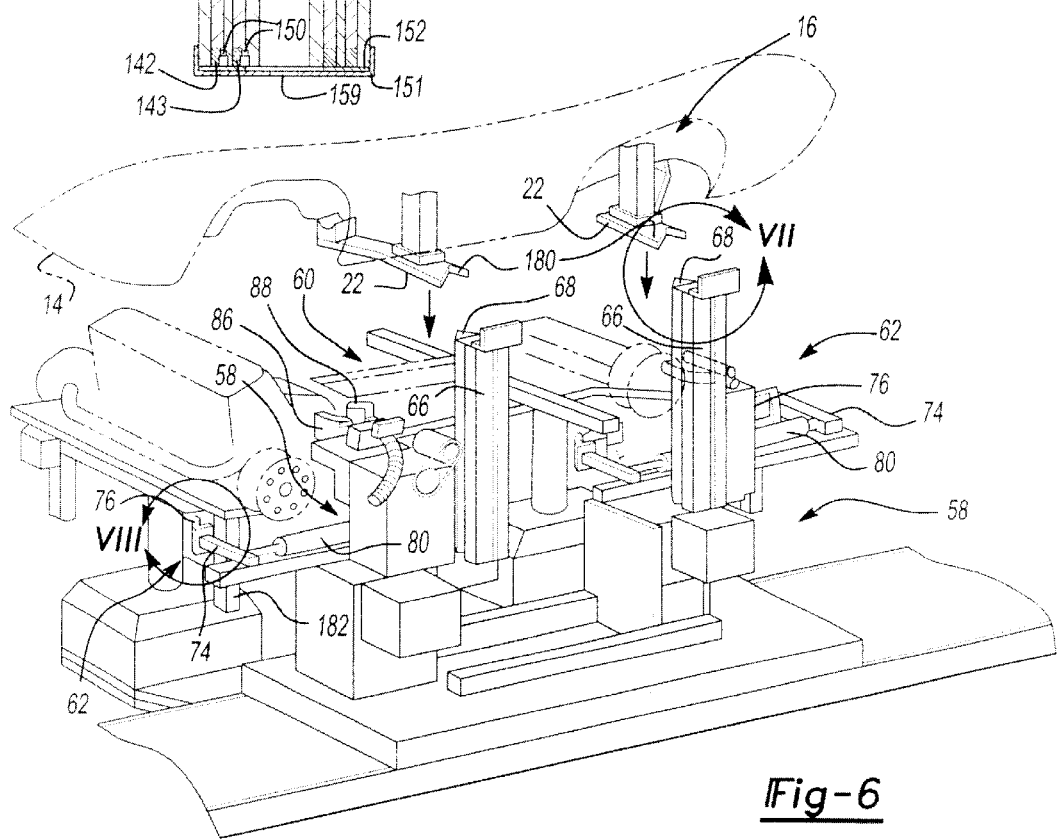
FIG. 6 is a perspective view of the mating machine of FIG. 2 coupling the vehicle assembly to the vehicle component mounted on the carriage.
Figure 7:
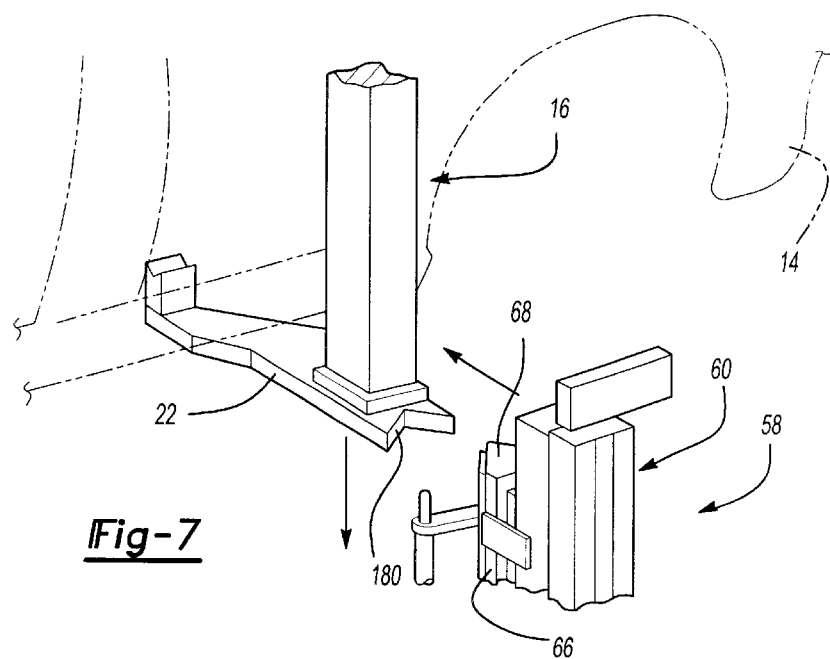
FIG. 7 is an enlarged view of the area of VII of FIG. 6 illustrating the indexing of the vehicle assembly holder to the mating machine.
Figure 8:
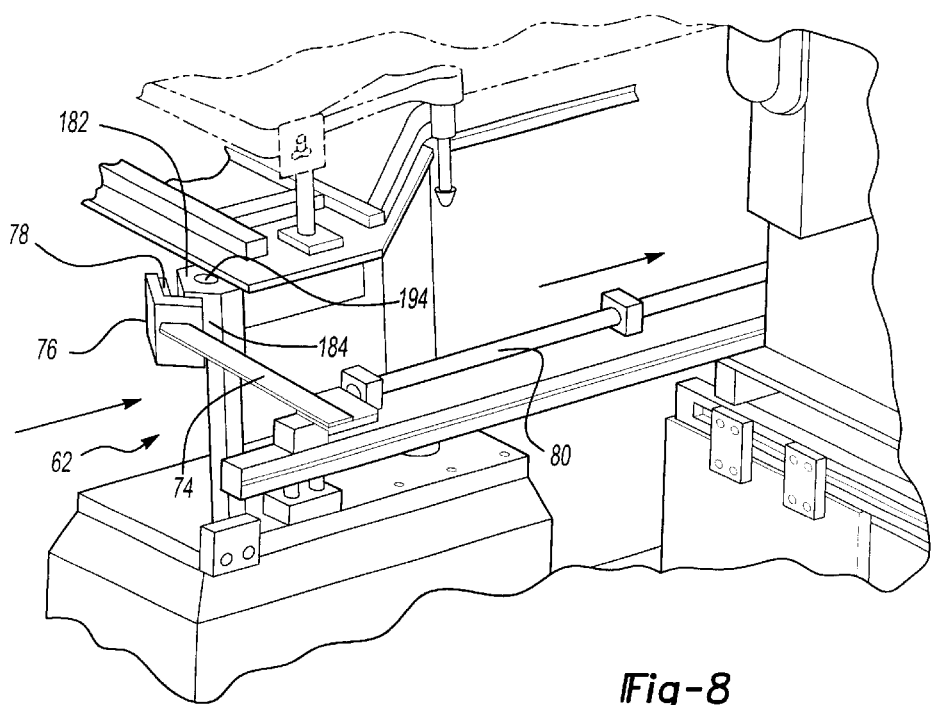
FIG. 8 is an enlarged view of area VIII of FIG. 6 illustrating the indexing of the component holder to the mating machine.

Referring to FIGS. 6–8, the mating machine 50 indexes the vehicle assembly holder 12 relative to the mating machine 50 by first moving the arm supports 58 towards the assembly path A to place the vehicle assembly holder indexers 60 and component holder indexers 62 in an operational position. From the operational position, the wedge-shape cross section of the guide keys 66 on the vehicle assembly indexers 60 are moved toward wedge-shaped guide slots 180 on the foot 22 of the hanger 16 to place the hanger in a reference position and index the hanger 16 relative to the mating machine 50. The hanger 16 holding the vehicle assembly 14 can then be lowered to move the vehicle assembly 14 toward the component holder 38 on which the components 40 and 42 are mounted. Alternatively, the component holders 38 could be moved upwardly.

Prior to or during the lowering of the hanger 16, the arm pairs 74 are brought together, resulting in the wedge-shaped guide slot 78 of the hands 84 receiving therein a wedge-shaped guide key 182 extending from the component holder 38, moving the component holder 38 in the horizontal plane to a reference position and thereby indexing the component holder relative to the mating machine 50.

The indexing of the vehicle assembly holder 12 and the component holder 38 to the mating machine to reference the vehicle assembly 14 to the components 40, 42, which are placed on the hanger 16 and the carriage 34 at known referenced positions. Therefore, the vehicle assembly 14 and the vehicle assembly holder 12 are indirectly referenced to the components 40, 42 and component holder 38 by the mating machine 50.

Figure 9:
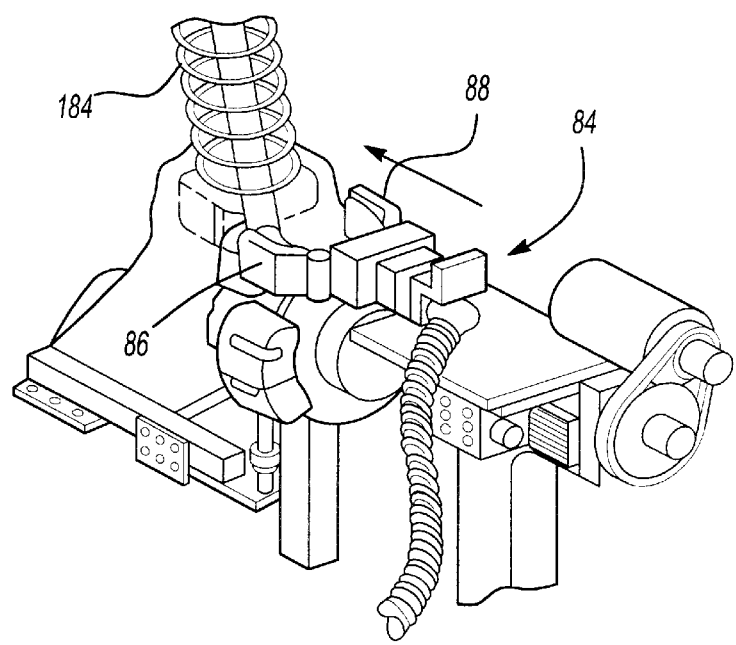
FIG. 9 is a perspective view illustrating the positioning of a front strut component.
Figure 10:
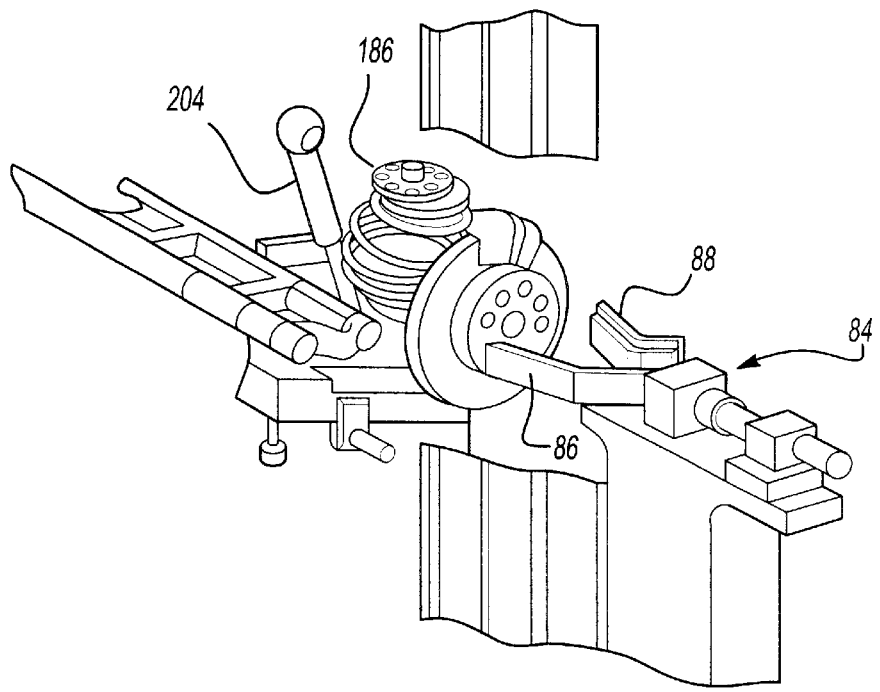
FIG. 10 is a perspective view illustrating the positioning of a rear spring component.

Referring to FIGS. 9 and 10, if the vehicle component or sub-component includes a moveable component such as front strut 184 or rear spring 186 that requires the vehicle assembly and component holder are moved relatively toward each other, the hands 84 of the mating machine 50 are extended to grasp the component between the fingers 86 and 88 and move the component or sub-component into a predetermined position. The hands 84 are preferably controlled so they know where to locate and place the component based on the hands and component reference position to the mating machine 50.

Figure 11:
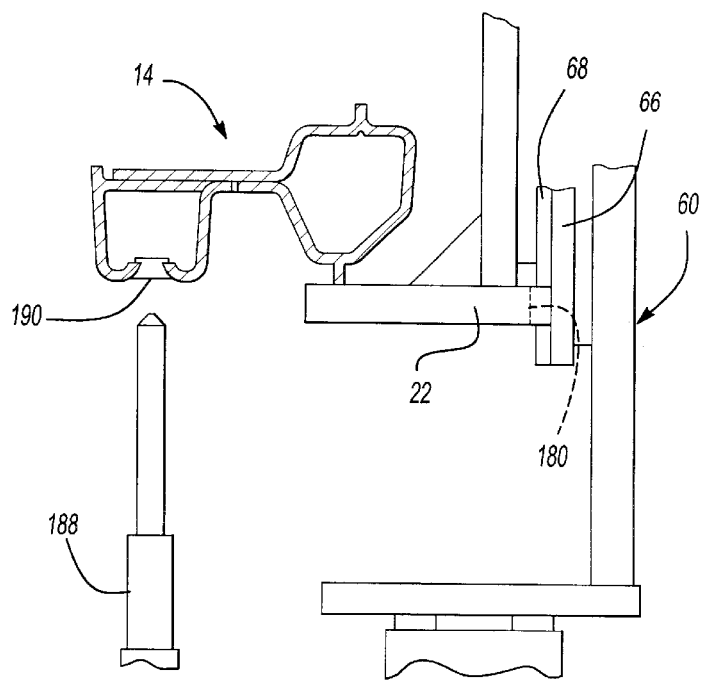
FIG. 11 is a perspective view illustrating the fixing of the index position of the component holder and the vehicle assembly holder by a positioning pin extending from the component holder into an opening in the vehicle assembly holder.
Figure 12:
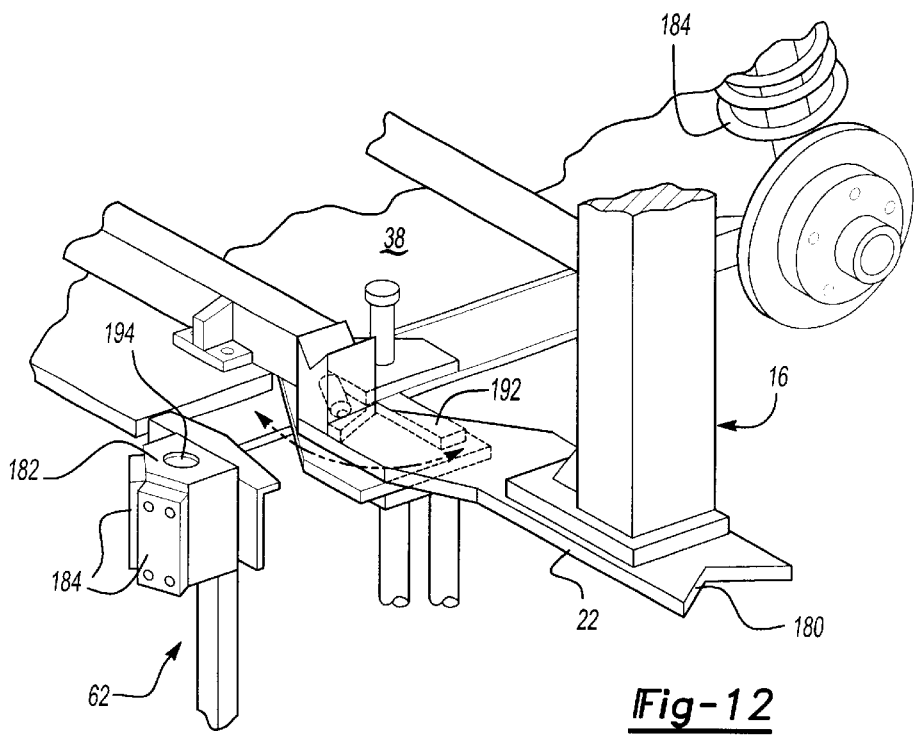
FIG. 12 is a perspective view illustrating a holding mechanism on the component holder for holding the vehicle assembly holder and component holder in the fixed indexed position.

Referring to FIGS. 11 and 12, once the vehicle assembly holder 12 and component holder 38 are indexed with respect to the mating machine 50 and the sub-components are properly oriented by the hands 84, the indexed position between the vehicle assembly holder 12 and the component holder 38 is fixed by inserting a positioning pin 188, extending from the component holder 38, into an opening 190 of the vehicle assembly 14. A holding mechanism comprising a locking arm 192 is then actuated to couple the vehicle assembly holder 12 to the component holder by securing the foot 22 to the component holder 38.

Once the mating machine 50 has uncoupled itself from the now coupled vehicle assembly holder 12 and component holder 38, it returns to its original position by moving in the reverse direction along the track 54 and awaits the next vehicle assembly holder 12 and component holder 38. The coupled vehicle assembly holder 12 and component holder 38 then move along the assembly path A until they encounter the fastening machine 52, which fastens all of the components and sub-components to the vehicle assembly 14.

As the coupled vehicle assembly 14 and component holder 38 move toward the fastening machine 52, the fastening machine 52 moves synchronously with the vehicle assembly holder 12 and component holder 38. While the fastening machine 52 is moving in synchronous motion, the tool support stations 94 and 96 move toward the assembly path A from a stand down position to an operational position. In the operational position, the positioning pins 100, extending from the support arms 102, are positioned below pin openings 194 in the guide keys 182 of the component holders 38. The tool support stations 94 and 96 are then raised to insert the pins 100 into the openings 194. The insertion of the positioning pins 100 into the pin openings 194 aligns and couples the fastening machine 52 relative to the coupled vehicle assembly holder 12 and component holder 38. In this way, the fastening machine 52 is able to reference the locations on the vehicle assembly 14 where the components 40, 42 are to be fastened.

Figure 13:
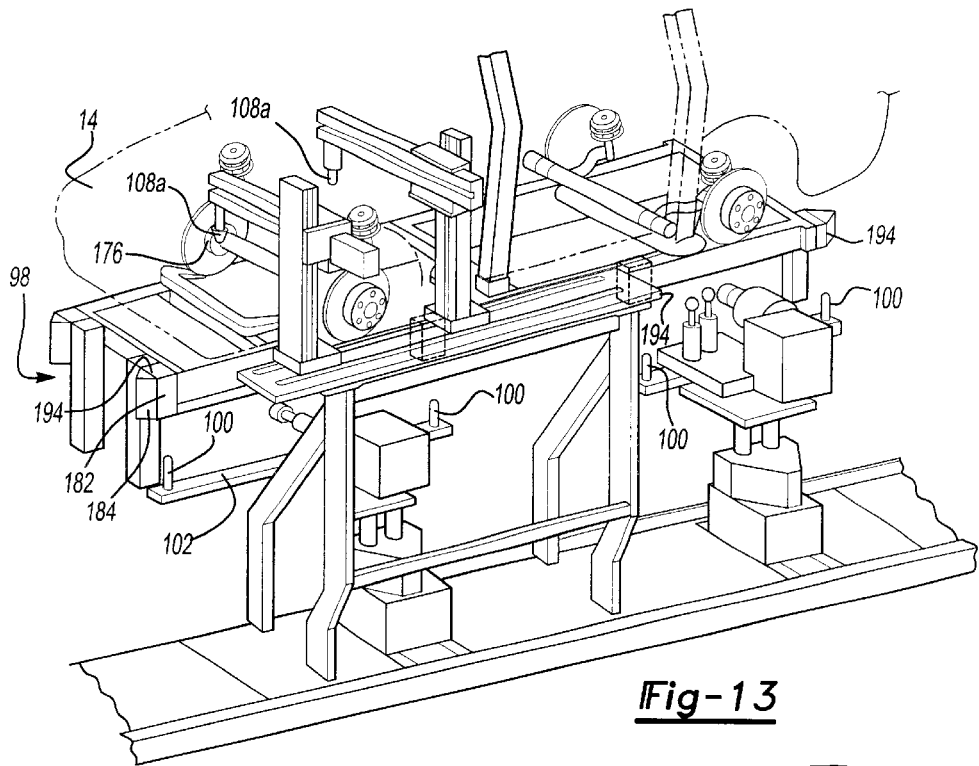
FIG. 13. is a perspective view illustrating a fastening machine for fastening the components on the component holder to the vehicle assembly on the vehicle assembly holder.
Figure 14:
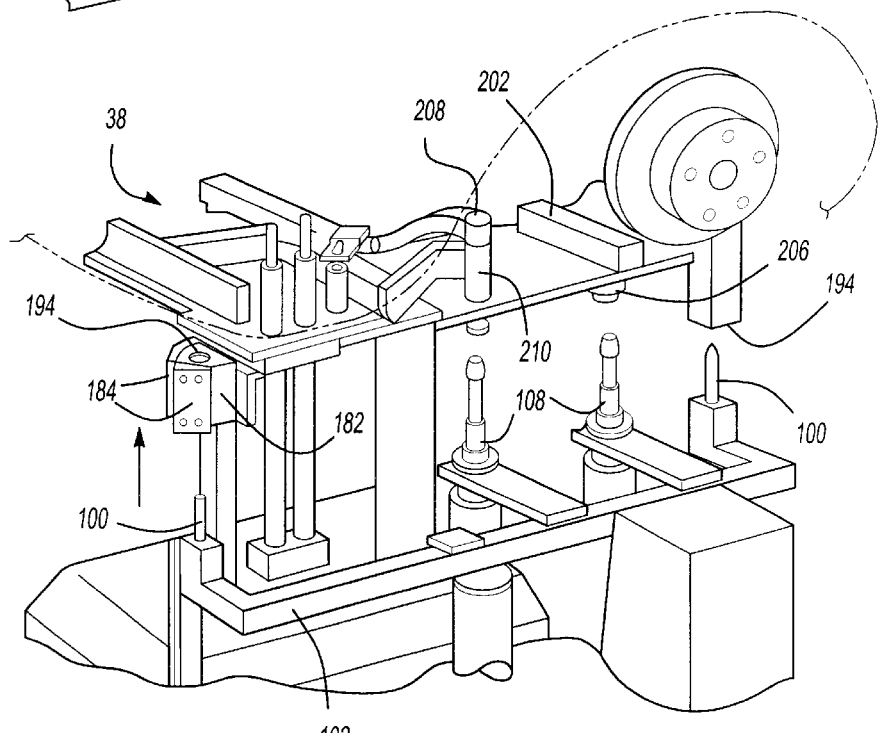
FIG. 14 is a perspective view of a portion of the fastening machine and coupled component holder and vehicle assembly holder illustrating the alignment of the fastening machine relative to the coupled component holder and vehicle assembly holder.
Figure 15:
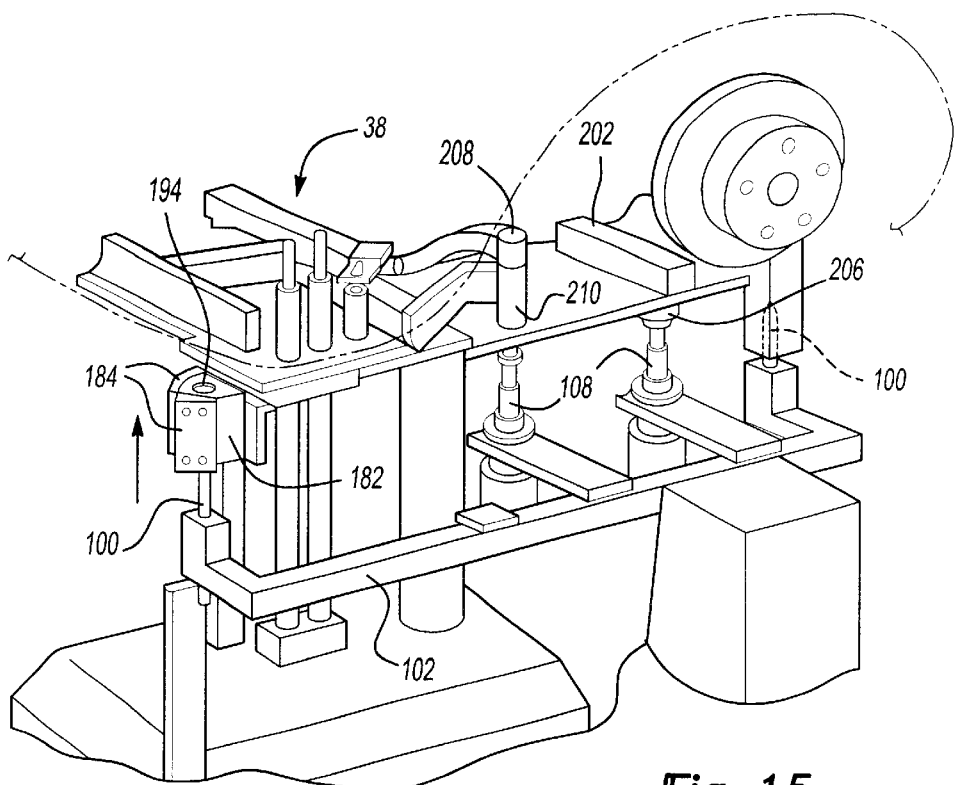
FIG. 15 is a perspective view of the fastening machine and the coupled component holder and vehicle assembly holder illustrating the insertion of a positioning pin of the fastening machine into the component holder to reference the fastening machine to the coupled component holder and vehicle assembly holder.
Figure 16:
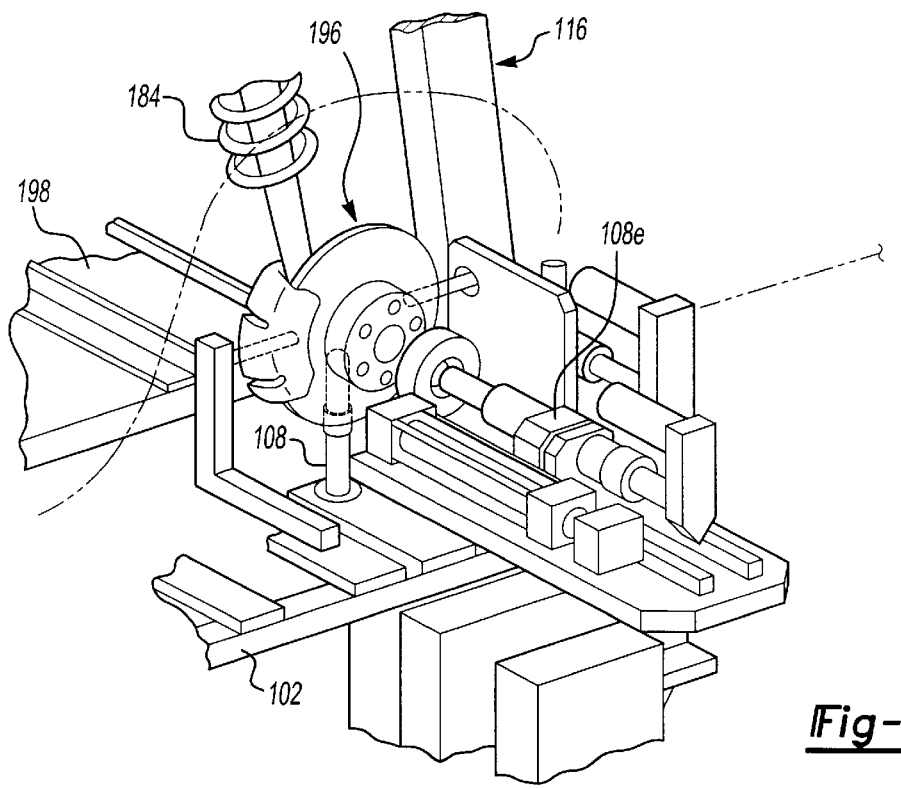
FIG. 16 is a perspective view of a portion of the fastening machine and the component holder coupled to the vehicle assembly holder and illustrating the fastening of a wheel hub to an axle shaft.
Figure 17:
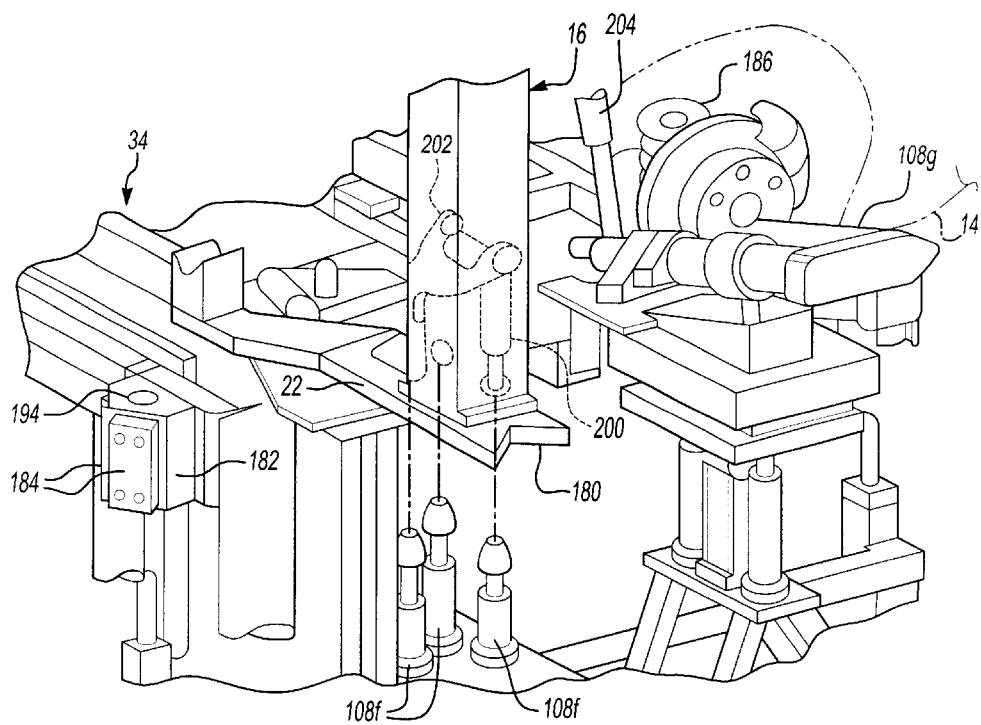
FIG. 17 is a perspective view of a portion of the fastening machine and the component holder coupled to the vehicle assembly holder and illustrating the fastening of the rear axle and shock absorber to an underbody portion of the vehicle assembly.
Figure 18:
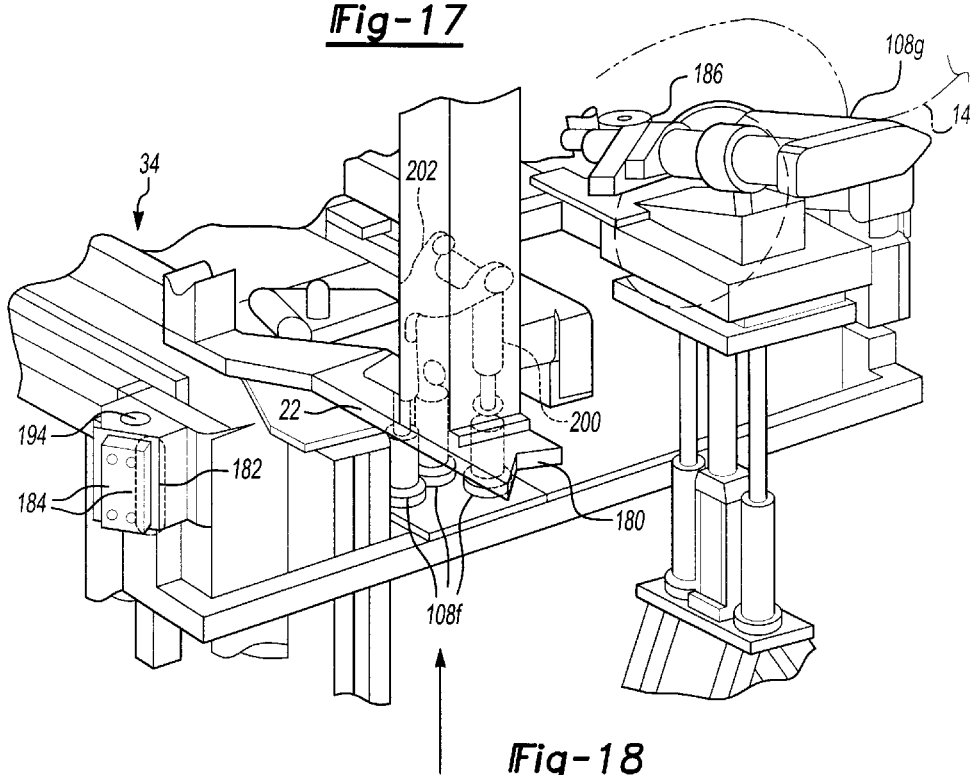
FIG. 18 is a perspective view of a portion of the fastening machine and the component holder coupled to the vehicle assembly holder and illustrating the insertion of the positioning pins into the component holder and the fastening of the rear axle and the shock absorber to the underbody.
Figure 19:
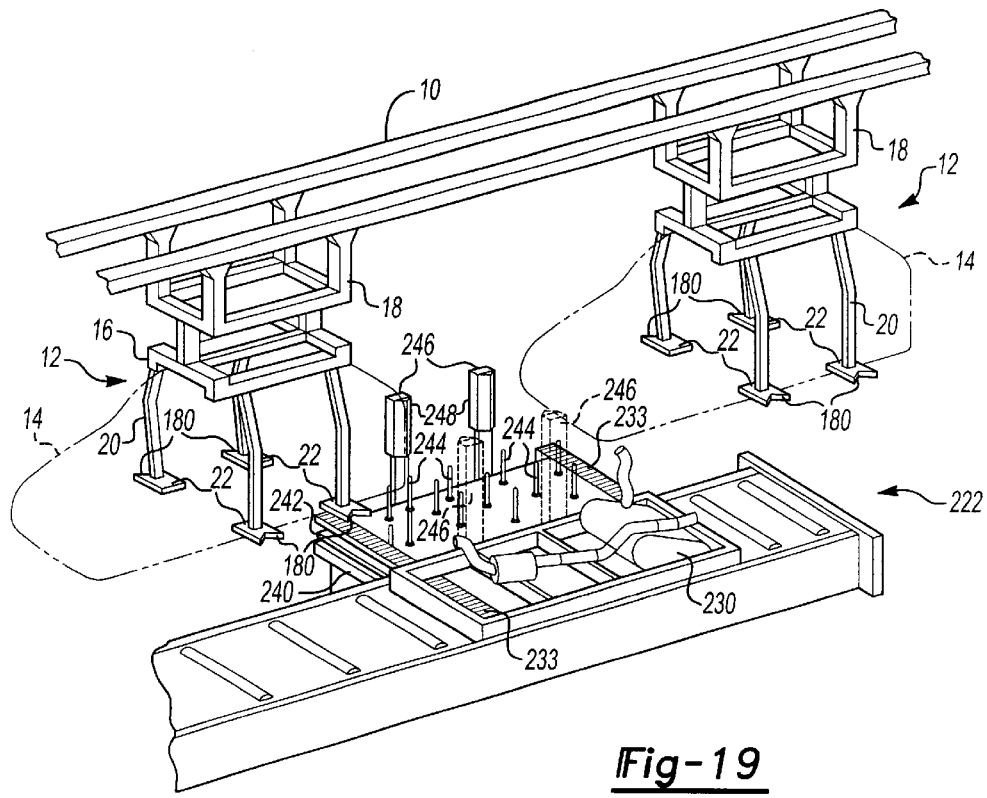
FIG. 19 is perspective view of a docking station for the module assembly of FIG. 1b and illustrating a module positioned on the module holder on a pallet conveyor adjacent a docking station.
Figure 20:
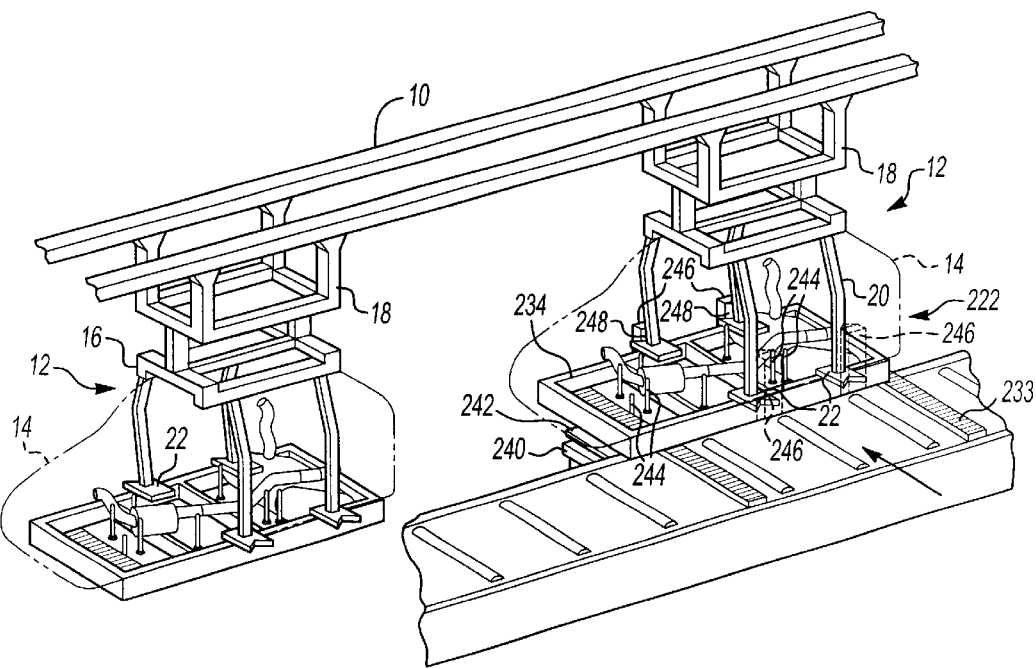
FIG. 20 illustrates the docking station of FIG. 19 with the pallet mounted to a lift platform in the docking station.
Figure 21:
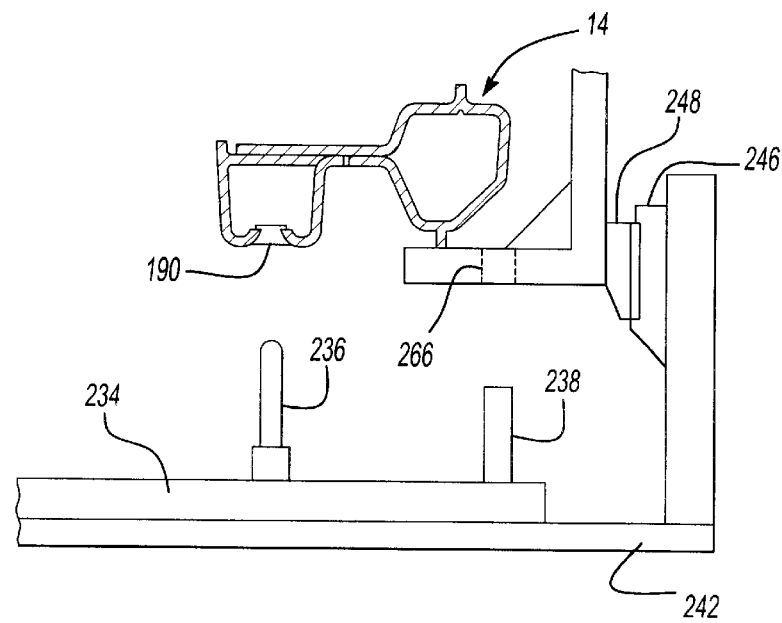
FIG. 21 is a schematic view illustrating the indexing and positioning of the pallet to the vehicle assembly.
Figure 22:
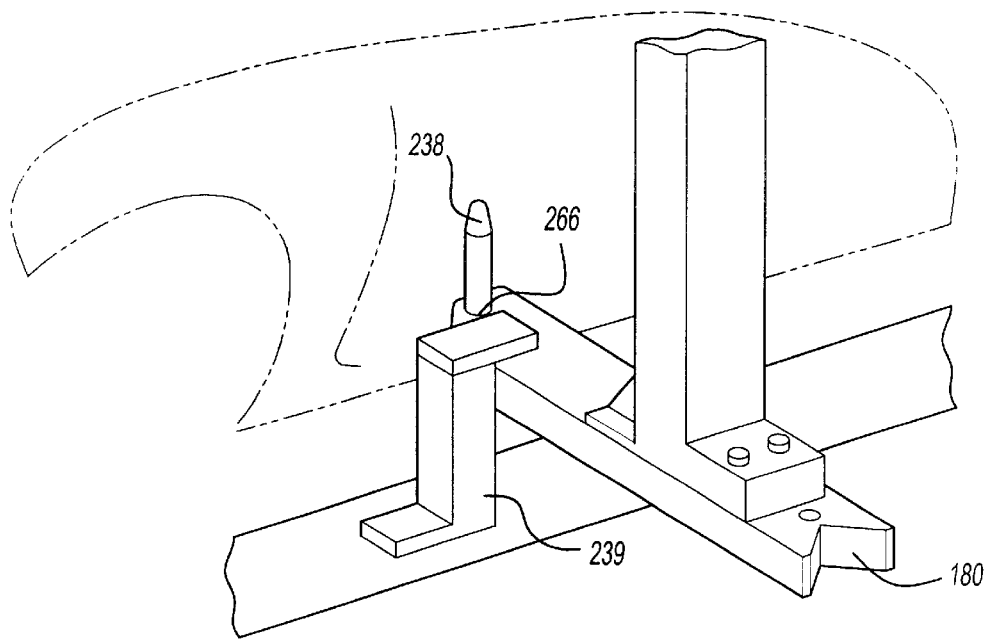
FIG. 22 is an enlarged perspective view of the clamping of the pallet to the vehicle assembly holder.

As the positioning pins 100 are inserted into the pin openings 194, various fastening tools 108 on the tool support stations 94, 96, 98 are aligned with and brought into communication with the components to be fastened. The fastening tools 108 are then activated to fasten the respective components to the vehicle assembly 14. For example, fastening tools 108a of FIG. 13 fasten the engine mounts 176 and the struts 184 to the vehicle assembly 14, respectively. The fastening tools 108c and 108d of FIG. 14 fasten a sub-frame 206 to an underbody portion 202 of the vehicle assembly 14 and a tie-rod 208 to a steering knuckle 210, respectively. FIG. 16 illustrates the fastening of a wheel hub 196 to an axle shaft 198 with fastening tools 108e. FIG. 17 illustrates the fastening of the rear axle 200 to the underbody 202 by the fastening tools 108f and the fastening of a shock absorber 204 to the underbody 202 by fastening tools 108g.

It should be noted that the fastening of the wheel hub, axle shaft, rear axle, and shock absorber are for illustrative purposes and are not limiting to the invention. Any suitable type of component or sub-component can be mounted to the vehicle assembly using the component assembly station 1. It is only required that the proper fastening locations be determined and the fastening tools 108 be placed in the appropriate location.

Once the fastening machine 52 has completed fastening the various components and sub-components to the vehicle assembly, the fastening machine lowers the tool support stations 94, 96 to remove the positioning pins 100 from the pin openings 194 in the component holder 38 to uncouple the fastening machine 52 from the coupled component holder 38 and vehicle assembly holder 12, which move on down the assembly path A until they encounter a limit switch (not shown) that triggers the retraction of the positioning pin 188 from the vehicle assembly 14 and the locking arm 192 from the foot 22 of the vehicle assembly to uncouple the vehicle assembly holder 12 and the component holder 38. The vehicle assembly holder 12 is then lifted by the lifting and lower mechanism 18 and continues down the assembly path A.

The carriage 34 continues along the component path B until it enters the building area 44. In the building area 44, the various components 40, 42 and their sub-components are sequentially removed from part storage areas P and placed on the component holders 38 until the completed components 40, 42 are formed on the component holders 38. The carriage 34 with the completed components 40, 42 on the component holders 38 then continue along the component holder path B until it re-enters the assembly area 32 and the process of assembling the components 40, 42 to the vehicle assembly 14 is repeated.

Many, if not all, of the activations of the various elements of the component assembly station are controlled by a number of switches, such as limit switches, optical switches, etc. These switches are not described in the interest of brevity.

Module Assembly Station

FIGS. 1b and 19 through 24 illustrate the module assembly station 2 according to the invention. The module assembly station comprises a module conveyor having a docking station 222 at one end and an undocking station 224 at another end of a pallet conveyor 225. The module conveyor 220 is adapted to carry multiple module holders 226 along the pallet conveyor 225 where they are coupled with the vehicle assembly holders 12 at the docking station 222 and undocked from the vehicle assembly holders 12 at the undocking station 224 to define a module path E. A portion of the module path E coincides with the assembly path A. Specifically, the portion of the module path E that corresponds to the assembly path A is that portion between and including the docking station 222 and the undocking station 224 and also defines a module assembly area 228 in which a module 230 is assembled to the vehicle assembly 14.

A module building area 232 is provided adjacent the module conveyor 220 opposite the vehicle conveyor 10 and provides for the building of the module 230 on the module holders 226 as they pass between the undocking station 224 and docking station 222.

Referring to FIGS. 19 through 22 the module holders 226 are preferably pallets 234 on which various parts of the module are positioned at predetermined locations. The various components and parts of the module are stored in the parts bins P provided along the module conveyor 220 in the building area 232 and are placed by workers onto the pallets 234 as they move along the pallet conveyor 225. It should be noted that the term module can be a component or a sub-component.

The docking station 222 comprises a carriage 240, which is movable along the assembly path A. The carriage comprises a platform 242, which is movable in two dimensions within a horizontal plane. The platform includes a variety of fastening tools 244 extending upwardly from the platform 242. Additionally, the platform has movable guide keys 246 with wedge-shaped cross sections 248, which are adapted to be received within the guide slots 180 on the hanger feet 22. Powered rollers 233 are provided to move the pallet 234 from the pallet conveyor 225 onto the platform 242.

Figure 23:
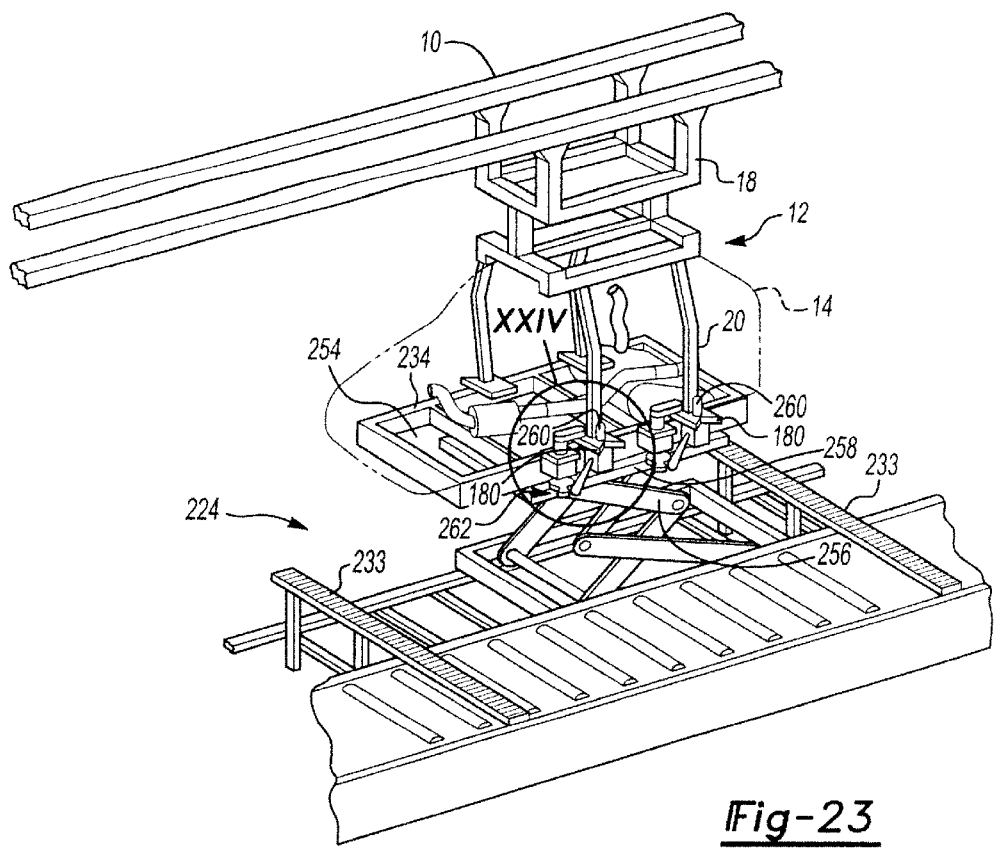
FIG. 23 is a perspective view of an undocking station of the module assembly station of FIG. 1b.
Figure 24:
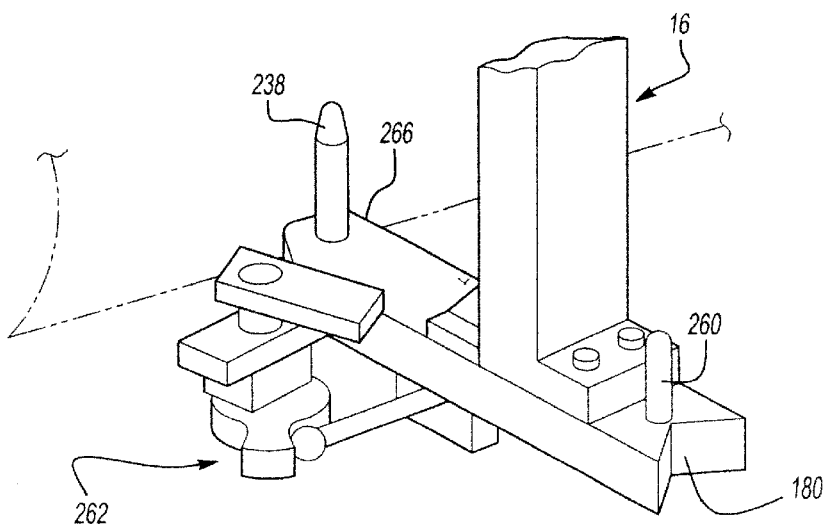
FIG. 24 is an enlarged perspective view of the uncoupling of the module holder from the vehicle assembly holder in the docking station.

Referring to FIGS. 23–24, the undocking station 224 comprises a lift platform 254, which is preferably lifted by a scissor-type lift mechanism 256. The lift platform 254 includes a locating lever 258 and indexing pins 260. The lift platform 254 additionally comprises powered rollers 262 for moving the pallet 234 from the platform 254 onto the pallet conveyor 225.

In operation, as the vehicle conveyor 10 carries multiple vehicle assembly holders 12 with vehicle assemblies 14 into the module assembly area 228, pallets 234 provided on the module conveyor 220 are having parts placed thereon to build the module 230. As the building of the module 230 on the pallet 234 is completed, the pallet 234 reaches the docking station 222, where it is moved from the pallet conveyor 225 onto the docking station 222 by powered rollers 233.

Once the pallet with the module 230 is positioned onto the platform 242 of the carriage 240, the carriage 240 moves in synchronous motion with the vehicle assembly holder 12 and the guide keys 246 on the platform are brought into the guide slots 180 on the foot 22 to index the pallet 234 with respect to the vehicle assembly holder 12. The platform 242 is then raised and the positioning pin 236 and indexing pin 238 are received within openings 190 in the vehicle assembly 14 and 266 in the foot 22. In this position, the pallet 234 is indexed with respect to the vehicle assembly holder 12 and the vehicle assembly 14. Once the vehicle assembly holder 12 and the pallet 234 are in the indexed position, the pallet 234 is clamped to the vehicle assembly holder 12 by the rotation of the clamping arm 239. The various fastening tools 244 are then operated to fasten the module 230 to the vehicle assembly 14. The platform 242 is then lowered and the pallet 234, which is coupled to the body holder 212, is carried along the assembly path A by the vehicle conveyor 10 until the pallet 234 reaches the undocking station 224.

As the coupled vehicle assembly holder 12 and pallet 234 enter the undocking station 224, the lift platform 254 is raised by the scissor lift 256. The locating lever 258 is extended upwardly and is brought into abutment with the foot 22 of the hanger 16 as the lift platform moves relative to the moving pallet 234, indicating that the lift platform 254 is properly aligned with the vehicle assembly holder 12 and pallet 234. The vehicle assembly holder 12 is then raised until indexing pins 260 are received within positioning pin openings 268 and the lift platform 254 is raised to completely insert the indexing pins within the indexing pin openings 268 (FIG. 24). The clamping arm 239 is then rotated to unclamp the pallet 234 from the foot of the vehicle assembly holder 12 and the lift platform 254 is lowered to uncouple the pallet 234 from the vehicle assembly holder 12. The powered rollers 202 then carry the pallet 234 onto the pallet conveyor 225 where it passes through the building area 232 to repeat the process.

Fluid Filing Station

Figure 25:
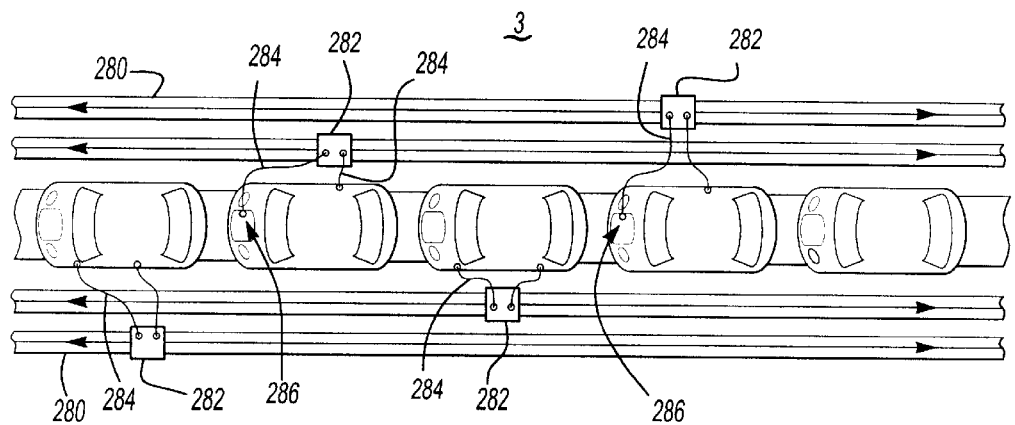
FIG. 25 is a schematic view of the fluid filling station of FIG. 1c.

FIG. 1c and FIG. 25 illustrate the fluid filling station 3 which includes the vehicle conveyor 10 on which are carried the vehicle assemblies 14. It should be noted that for the fluid filling station 3, the vehicle conveyor 10 is a conveyor belt on which the vehicles 14 ride and is no longer a series of vehicle assembly holders supporting the vehicle assembly 14.

The fluid filing station 3, comprises a pair of tracks 280 positioned parallel to the vehicle conveyor 10. A fluid reservoir 282 is suspended from each of the tracks and can move along the track in synchronization with the vehicle conveyor 10. The fluid reservoirs 282 contain a suitable fluid, such as brake fluid, oil, windshield washer fluid, transmission fluid, etc., and have one or more fluid hoses 284 extending from the fluid reservoir 282. A nozzle is mounted to the end of each of the hoses 284. The nozzle 286 can have a control panel located thereon to permit the actuation of the fluid filling process.

In operation, as a vehicle enters the fluid filling station 3, a worker takes the appropriate hose or hoses 284 and connects them to the appropriate location on the vehicle and initiates the fluid filling process by the control panel (not shown). The nozzle 286 and the control panel can have a variety of sensors to indicate when the fluid filling process is complete or if an error occurs. As one station completes its filling operation, it is disconnected from the vehicle assembly 14 and returns on the tracks 280 where it is coupled to the next available vehicle assembly 14.

The fluid filling station 3 can be used to fill the vehicle assembly 14 with a variety of different fluids. Depending on the type of fluid being filled, there may be a need for one or more hoses. In some instances, an additional hose is an overflow hose that will carry overfilled fluids back to the reservoir.

It is within the scope of the invention for there to be multiple fluid filling stations 3 in sequence or spaced at various points along the vehicle conveyor 10 to fill the variety of different fluids typically used in a contemporary vehicle.

Door Assembly

Figure 26:
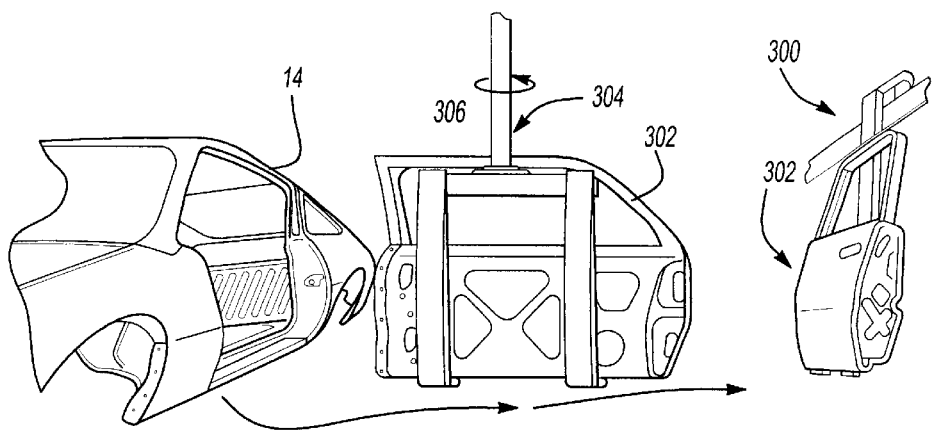
FIG. 26 is a perspective view of the door assembly station of FIG. 1c.

Referring to FIG. 1c and FIG. 26, the door assembly station is disclosed in greater detail. The door assembly station 4 comprises a door storage area 300 disposed near the vehicle conveyor 10. The door storage area 300 contains multiple doors 302 to be mounted to the vehicle assembly 14 carried through the door assembly station 4 by the vehicle conveyor 10. The door assembly station 4 additionally includes a door carrier 304 for moving the doors 302 from the door storage area to the vehicle assembly 14 on the vehicle conveyor 10.

The door carrier 304 is preferably a counterbalanced arm 306 capable for gripping and holding a door 302. The arm 306 is counterbalanced to aid the worker in carrying the door from the storage area 300 to the vehicle assembly 14.

The door assembly station 4 further includes a hinge pin gun (not shown) used to install a hinge pin between the door and the vehicle assembly to pivotally mount the door to the vehicle assembly.

In operation, as the vehicle assembly 14 is carried into the door assembly station 4 by the vehicle conveyor 10, a worker grasps the counterbalanced arm 306 and walks to the door storage area where the worker uses the arm to grasp a door 302 and then carry the door to the vehicle assembly 14 as it moves through the door assembly station 3. The worker then positions the door 302 in alignment with the hinges on the vehicle assembly 14 and inserts the hinge pin (not shown) with the hinge pin gun. The vehicle assembly then moves along the assembly path A to the next station.

Wheel Alignment Station

Figure 27:
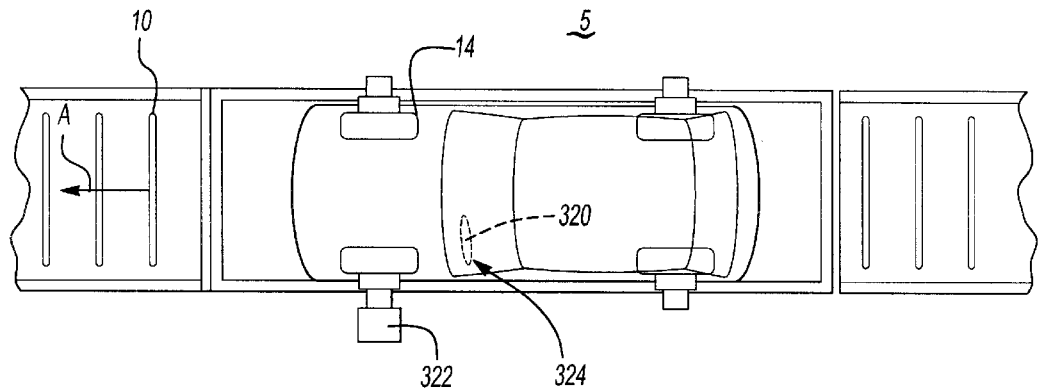
FIG. 27 is a schematic view of the wheel alignment station of FIG. 1c.

FIGS. 1c and FIG. 27 disclose the wheel alignment station 5 in accordance with the invention. The wheel alignment station is located adjacent the vehicle conveyor 10 along the assembly path A. The wheel alignment station 5 includes a steering wheel centering device 320 and a wheel centering device 322, both of which are connected to an overhead controller (not shown). As the vehicle assembly 14 enters the wheel alignment station 5, the steering wheel centering device 320 is placed on a steering wheel 324 of the vehicle assembly 14. Similarly, the wheel centering device 322 is placed on the wheel of the vehicle assembly 14. The steering wheel 324 is then centered to a neutral position and while in the neutral position, the wheels 322 are aligned to provide the proper wheel alignment when the steering wheel is in the centered position.

Brake Test Station

Figure 28:
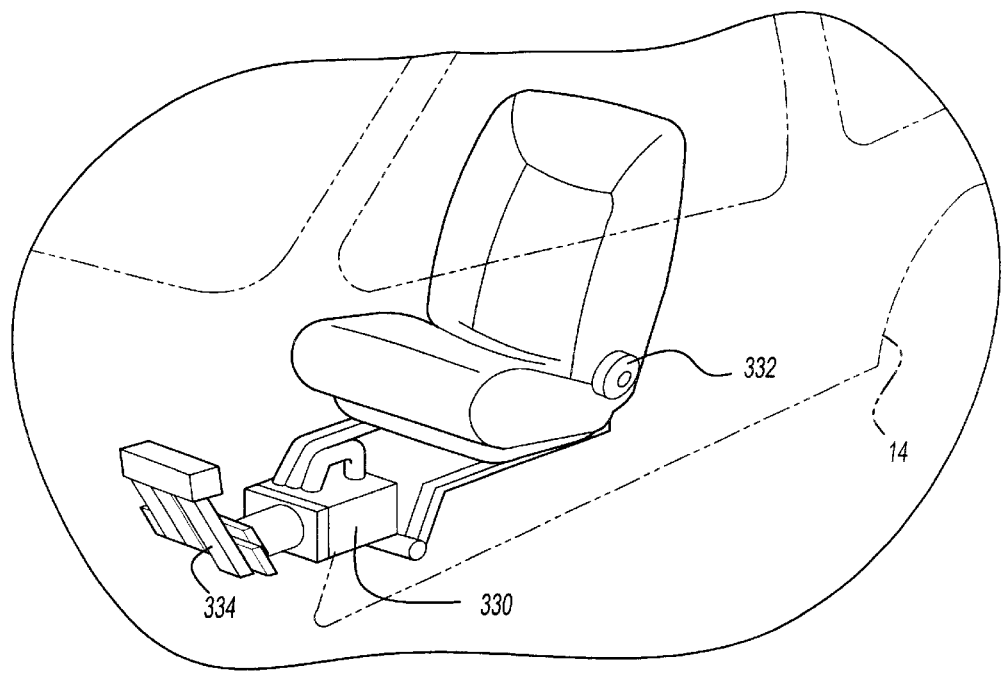
FIG. 28 is a perspective view of the brake test station of FIG. 1c.

FIG. 1c and FIG. 28 disclose a brake test station 6 according to the invention. The brake test station is positioned adjacent the vehicle conveyor 10 along the assembly path A. The brake test station 6 includes a brake pedal actuator 330 that is carried by a worker and described in greater detail in U.S. Pat. No. 5,168,750. As the vehicle assembly 14 enters the brake test station 6, the worker inserts the brake pedal actuator 330 into the vehicle assembly 14 between a vehicle seat 332 and the brake pedal 334. The worker then actuates the brake pedal actuator, which depresses the brake pedal and measures the resistance to determine if the brake system is working properly.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. A method of automatically assembling a vehicle in an automated line comprising a vehicle assembly conveyor defining an assembly path and having multiple vehicle assembly holders each adapted to carry a vehicle assembly and a component conveyor defining a component path and having multiple component holders each adapted to carry a component and the component conveyor continuously moving the component holder along the component path, and a portion of the component path coincides with the assembly path to define an assembly area, the method comprising:
   continuously moving the vehicle assembly holders and the component holders in synchronous motion along the assembly area;
   coupling the vehicle assembly holder to component holder while the vehicle assembly holders and component holders are being continuously moved in synchronous motion;
   wherein the coupling of the vehicle assembly holder and the component holder comprises indexing the vehicle assembly holder and the component holder while the vehicle assembly holder and component holder are moving;
   wherein the indexing of the component holder to the vehicle assembly holder comprises indirectly indexing the component holder and the vehicle assembly holder to a mating machine moving along the assembly path in the assembly area; and
   wherein the indirect indexing comprises indexing the vehicle assembly holder to the mating machine by moving a guide key on the mating machine into a guide slot on the vehicle assembly holder and indexing the component holder to the mating machine by extending an arm from the mating machine into contact with the component holder and moving the component holder to a predetermined position.

2. The method of claim 1, wherein the indirect indexing of the component holder to the mating machine further comprises inserting an alignment pin on the mating machine into an alignment opening on the component holder.

3. The method of claim 2 and further comprising fixing the indexed position of the vehicle assembly holder and the component holder independent of the mating machine.

4. The method of claim 3, wherein the fixing of the indexed position comprises inserting a pin on the component holder into an opening on one of the vehicle assembly and vehicle assembly holder.

5. The method of claim 4, wherein the fixing of the indexed position further comprises direct coupling of the vehicle assembly holder and the component holder.

6. The method of claim 1 and further comprising fixing the component holder relative to the vehicle assembly holder in the indexed position.

7. The method of claim 6, and further comprising clamping of the component holder to the vehicle assembly holder in the fixed indexed position.

8. The method of claim 1 and further comprising positioning a component on the component holder to a predetermined position relative to the vehicle assembly.

9. The method of claim 8, wherein positioning of a component relative to the vehicle assembly comprises relatively moving the component holder and the vehicle assembly holder toward each other.

10. The method of claim 1 and further comprising fixing the indexed position of the vehicle assembly holder and the component holder independent of the mating machine.

11. The method of claim 10 and further comprising uncoupling of the mating machine from the vehicle assembly holder and the component holder.

12. The method of claim 10 and further comprising fastening a component on the component holder to the vehicle assembly.

13. The method of claim 12, wherein the fastening of a component to the vehicle assembly comprises screwing a component to the vehicle assembly.

14. The method of claim 12, wherein the fastening of a component to the vehicle assembly comprises bolting a component to the vehicle assembly.

15. The method of claim 12, wherein the fastening of a component to the vehicle assembly occurs while the vehicle assembly holder and component holder are moving.

16. The method of claim 15, wherein the fastening of a component to the vehicle assembly comprises coupling a fastening machine to the component holder.

17. The method of claim 16, wherein the coupling of the fastening machine to the component holder comprises moving the fastening machine along the assembly path as the fastening machine is coupled.

18. The method of claim 17, wherein the coupling of the fastening machine to the component holder comprises inserting an alignment pin on the fastening machine into an opening in the component holder.

19. The method of claim 10 and further comprising fastening a component on the component holder to the vehicle assembly.

20. The method of claim 19 and further comprising automatic mounting of a module carried by a module holder to the vehicle assembly.

21. The method of claim 20, wherein the automatic mounting of the module comprises moving the module holder along a module path, a portion of which coincides with the assembly path.

22. The method of claim 21 and further comprising coupling the module holder to the vehicle assembly holder.

23. The method of claim 22, wherein the coupling of the module holder to the vehicle assembly holder occurs while the vehicle assembly and the module holder are moving.

24. The method of claim 22, wherein the coupling of the module holder to the vehicle assembly holder comprises indexing the module holder and the vehicle assembly holder.

25. The method of claim 24, wherein the indexing comprises moving a guide key on the module holder into a guide slot on the vehicle assembly holder.

26. The method of claim 25, wherein the indexing of the module holder to the vehicle assembly holder comprises inserting an alignment pin on the module holder into an alignment opening on one of the vehicle assembly and vehicle assembly holder.

27. The method of claim 26 and further comprising fixing the indexed position of the vehicle assembly holder and the module holder.

28. The method of claim 27, wherein the fixing of the indexed position further comprises the direct coupling of the vehicle assembly holder and the module holder.

29. The method of claim 10 and further comprising mounting of a door to the vehicle assembly.

30. The method of claim 29, wherein the mounting of the door to the vehicle assembly comprises moving the door from a door storage area to the vehicle assembly.

31. The method of claim 30, wherein the mounting of the door further comprises installing a hinge pin between the door and the vehicle assembly to mount the door to the vehicle assembly.

32. The method of claim 29 and further comprising filling with fluid at least one of the component and module mounted to the vehicle assembly.

33. The method of claim 32, wherein the fluid is filled while the vehicle assembly is moving along the assembly path.

34. The method of claim 32, wherein the fluid filing comprises connecting the one of the at least one of the module and component to a fluid reservoir.

35. The method of claim 34, wherein the fluid filling further comprises monitoring the filling of the fluid for correct filling.

36. The method of claim 35, wherein the fluid filling further comprises disconnecting one of the at least one module and component from the fluid reservoir.

37. The method of claim 34 and further comprising moving the fluid reservoir along the assembly path.

38. The method of claim 32, wherein the components mounted to the vehicle assembly include a steering wheel and a wheel and the method further comprises aligning the wheel and the steering wheel.

39. The method of claim 38, wherein the aligning of the wheel and steering wheel comprises positioning the steering wheel in a neutral position and aligning the wheel.

40. The method of claim 38, wherein the vehicle assembly has a brake system with a brake pedal mounted thereto and the method further comprises testing the brake system.

41. The method of claim 40, wherein the testing of the brake system comprises the depressing of the brake pedal and monitoring the depression force.

* * * * *